United States Patent
Sheets, Jr.

(10) Patent No.: US 11,236,971 B2
(45) Date of Patent: Feb. 1, 2022

(54) SOLAR POWERED CAP ASSEMBLY FOR OPTICAL SIGHTING SYSTEMS

(71) Applicant: PRIMARY ARMS, LLC, Houston, TX (US)

(72) Inventor: Robert E Sheets, Jr., Houston, TX (US)

(73) Assignee: PRIMARY ARMS, LLC, Houston, TX (US)

(*) Notice: Subject to any disclaimer, the term of this patent is extended or adjusted under 35 U.S.C. 154(b) by 0 days.

(21) Appl. No.: 16/924,925

(22) Filed: Jul. 9, 2020

(65) Prior Publication Data

US 2021/0010784 A1 Jan. 14, 2021

Related U.S. Application Data

(60) Provisional application No. 62/872,487, filed on Jul. 10, 2019.

(51) Int. Cl.
| | |
|---|---|
| *F41G 11/00* | (2006.01) |
| *F41G 1/34* | (2006.01) |
| *H02S 40/38* | (2014.01) |
| *G02B 27/34* | (2006.01) |
| *H02J 7/35* | (2006.01) |

(52) U.S. Cl.
CPC .............. *F41G 11/00* (2013.01); *F41G 1/345* (2013.01); *G02B 27/34* (2013.01); *H02J 7/35* (2013.01); *H02S 40/38* (2014.12)

(58) Field of Classification Search
CPC ..... F41G 1/30–38; F41G 11/00; G02B 27/34; H02J 7/35; H02S 40/38

USPC .......................................................... 42/131
See application file for complete search history.

(56) References Cited

U.S. PATENT DOCUMENTS

| | | | | |
|---|---|---|---|---|
| 5,189,555 | A * | 2/1993 | Jorlov ................. | G02B 23/105 356/247 |
| 6,505,952 | B1 * | 1/2003 | Kish ..................... | H02J 7/0044 362/197 |
| 6,519,889 | B1 * | 2/2003 | Schlierbach ......... | G02B 23/105 42/113 |
| 7,806,331 | B2 | 10/2010 | Windauer et al. | |
| 8,915,008 | B2 * | 12/2014 | Mauricio .............. | F41G 11/007 42/111 |
| 8,966,805 | B2 * | 3/2015 | Koesler ................ | F41G 1/38 42/119 |
| 9,074,846 | B2 * | 7/2015 | Mencotti .............. | F41G 3/06 |
| 9,982,965 | B2 * | 5/2018 | Sun ...................... | F41G 1/30 |

(Continued)

OTHER PUBLICATIONS

PCT Notification of Transmittal of the International Search Report and the Written Opinion of the International Searching Authority, or the Declaration; dated Oct. 1, 2020; International Application No. PCT/US20/41438; International Searching Authority, United States Patent and Trademark Office.

(Continued)

*Primary Examiner* — Troy Chambers
*Assistant Examiner* — Benjamin S Gomberg
(74) *Attorney, Agent, or Firm* — The Compton Law Firm, P.C.; Scott D. Compton

(57) ABSTRACT

The disclosure is directed to a power source for one or more firearm optical sighting systems. The power source includes a solar powered cap assembly operationally configured to electrically communicate with one or more firearm optical sighting systems.

18 Claims, 11 Drawing Sheets

(56) References Cited

U.S. PATENT DOCUMENTS

| | | | |
|---|---|---|---|
| 10,054,399 B2* | 8/2018 | VanBecelaere | G02B 23/00 |
| 2004/0148841 A1* | 8/2004 | Burzel | F41G 1/44 |
| | | | 42/123 |
| 2010/0220309 A1 | 9/2010 | Zhu et al. | |
| 2012/0151816 A1* | 6/2012 | Kleck | F41G 1/30 |
| | | | 42/132 |
| 2013/0253820 A1 | 9/2013 | Denk | |
| 2014/0101982 A1 | 4/2014 | McPhee | |
| 2014/0237884 A1 | 8/2014 | Koesler et al. | |
| 2014/0360581 A1 | 12/2014 | Ninomiya et al. | |
| 2016/0356573 A1* | 12/2016 | Berlips | F41G 3/16 |
| 2017/0082400 A1 | 3/2017 | York et al. | |
| 2017/0363387 A1* | 12/2017 | Sun | F41G 1/345 |
| 2018/0010887 A1 | 1/2018 | VanBecelaere | |

OTHER PUBLICATIONS

Sheets. Jr., Claims 1-13 of International Application No. PCT/US20/41438; dated Jul. 9, 2020.

* cited by examiner

SOLAR POWERED CAP ASSEMBLY FOR OPTICAL SIGHTING SYSTEMS

CROSS-REFERENCE TO RELATED APPLICATIONS

This application claims benefit of U.S. Provisional Patent Application Ser. No. 62/872,487, filed on Jul. 10, 2019, the content of which is hereby incorporated by reference in its entirety.

STATEMENT REGARDING FEDERALLY SPONSORED RESEARCH OR DEVELOPMENT

Not applicable.

BACKGROUND OF THE DISCLOSURE

1. Field of the Invention

The disclosure relates generally to optical sighting systems.

2. Background Art

Known firearm optical sighting systems provided with LEDs for illuminating reticles typically use batteries such as lithium coin cell batteries or the like to power the LEDs. One drawback to coin cell batteries is their limited service life requiring replacement over time. Other firearm optical sighting systems have been developed to replace coin cell batteries with solar power, e.g., see U.S. Pat. No. 9,982,965 B2, issued on May 29, 2018, titled "Inner Red-Dot Gun Sighting Device Powered by Solar Cell and Provided with Micro-Current LED Light Source," which is herein incorporated by reference in its entirety. However, such solar powered firearm optical sighting systems are provided as separate commercial items requiring one to purchase or otherwise obtain the entire solar powered optical sighting system in order to make use of solar power. A need exists to employ solar power with existing coin cell battery powered firearm optical sighting systems.

SUMMARY OF THE DISCLOSURE

The present disclosure is directed to a power source for firearm optical sighting systems, including a solar powered cap assembly operationally configured to electrically communicate with a battery compartment of a firearm optical sighting system in a manner effective to power the firearm optical sighting system.

The present disclosure is also directed to a power source for firearm optical sighting systems, including a cap assembly comprising (1) a housing having a threaded connection operationally configured to removably attach to a battery compartment of a firearm optical sighting system, (2) one or more solar cells disposed on the housing operationally configured to convert light energy into electrical energy, (3) a positive contact and a negative contact for electrical communication with a battery compartment of a firearm optical sighing system, (4) one or more rechargeable electrical energy storage devices operationally configured to store electrical energy, (5) control circuitry in electrical communication with the one or more solar cells, the positive and negative contacts and the one or more electrical energy storage devices and operationally configured to feed power at a controlled voltage and controlled rate to a firearm optical sighting system.

The present disclosure is also directed to a solar powered firearm optical sighting system having an illuminated reticle, including (a) one or more light-emitting diodes; (b) a battery compartment; and (c) a removable cap assembly in electrical communication with the battery compartment in a manner effective to power the firearm optical sighting system, the removable cap assembly including (1) one or more solar cells operationally configured to convert light energy into electrical energy, (2) an electrical energy storage device operationally configured to store electrical energy, and (3) control circuitry in electrical communication with the one or more solar cells and the electrical energy storage device.

DEFINITIONS USED IN THE DISCLOSURE

Figure 1:
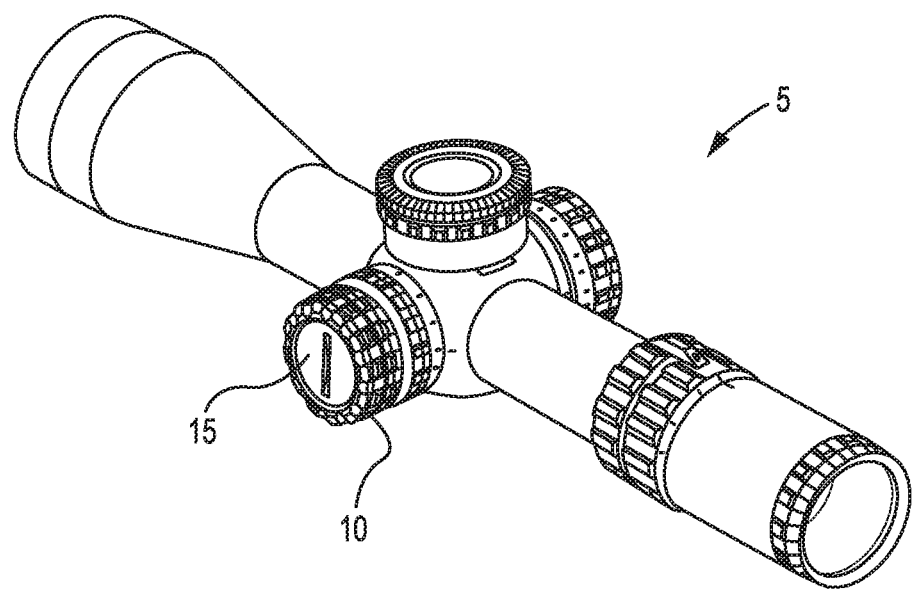
FIG. 1 is a top perspective view of an exemplary third-party firearm optical sighting system commercially available at the time of this disclosure.

The term "at least one", "one or more", and "one or a plurality" mean one thing or more than one thing with no limit on the exact number; these three terms may be used interchangeably within this disclosure. For example, at least one device means one or more devices or one device and a plurality of devices.

The term "about" means that a value of a given quantity is within ±20% of the stated value. In other embodiments, the value is within ±15% of the stated value. In other embodiments, the value is within ±10% of the stated value. In other embodiments, the value is within ±7.5% of the stated value. In other embodiments, the value is within ±5% of the stated value. In other embodiments, the value is within ±2.5% of the stated value. In other embodiments, the value is within ±1% of the stated value.

The term "substantially" or "essentially" means that a value of a given quantity is within ±10% of the stated value. In other embodiments, the value is within ±7.5% of the stated value. In other embodiments, the value is within ±5% of the stated value. In other embodiments, the value is within ±2.5% of the stated value. In other embodiments, the value is within ±1% of the stated value. In other embodiments, the value is within ±0.5% of the stated value. In other embodiments, the value is within ±0.1% of the stated value.

DETAILED DESCRIPTION OF THE DISCLOSURE

For the purposes of promoting an understanding of the principles of the disclosure, reference is now made to the embodiments illustrated in the drawings and particular language will be used to describe the same. It is understood that no limitation of the scope of the claimed subject matter is intended by way of the disclosure. As understood by one skilled in the art to which the present disclosure relates, various changes and modifications of the principles as described and illustrated are herein contemplated.

Before describing the invention in detail, it is to be understood that the invention is not limited to particular embodiments. It is also to be understood that the terminology used herein is for the purpose of describing particular embodiments only and is not intended to be limiting. As used in this specification and the appended claims, the phrase "optical sighting system" in relation to firearms may include, but is not necessarily limited to red dot sights, rifle scopes and prism scopes as such terms are understood by persons of ordinary skill in the art firearm optics. The phrase "electrical power" is the product of current and voltage. As understood by the skilled artisan, coin cell batteries are commonly used to power small portable electronics devices including but not necessarily limited to wrist watches, pocket calculators, small LED powered flash lights, automobile keyless entry transmitters, and the like. Herein, the terms "button cell battery," "button cell," "button style battery," "coin cell battery," "coin cell" and "coin style battery" may be used interchangeably. Herein, "LED" refers to light-emitting diode. Herein, "OE" stands for original equipment.

In one embodiment, the present disclosure is directed to a solar powered battery cap assembly, system and method for firearm optical sighting systems comprising illuminated reticles. In another embodiment, the present disclosure is directed to a solar powered replacement battery cap assembly, system and method for firearm optical sighting systems comprising illuminated reticles.

In another embodiment, the present disclosure is directed to a replacement power source for one or more third-party firearm optical sighting systems.

In another embodiment, the present disclosure is directed to a method of modifying a source of power of one or more third-party firearm optical sighting systems.

In another embodiment, the present disclosure provides a method of modifying a power source of one or more third-party firearm optical sighting systems via a single replacement power source for universal use amongst different third-party firearm optical sighting systems.

In another embodiment, the present disclosure provides a solar powered cap assembly operationally configured to replace OE battery caps of coin cell battery powered firearm optical sighting systems. In one implementation, a solar powered cap assembly may be operationally configured to replace an OE battery cap of a particular third-party firearm optical sighting system. In another implementation, a solar powered cap assembly may be operationally configured to replace an OE battery cap of two or more particular third-party firearm optical sighting systems.

In another embodiment, the present disclosure provides a solar powered replacement cap for battery caps of coin cell battery powered third-party firearm optical sighting systems having illuminated reticles.

In another embodiment, the present disclosure provides a replacement cap for battery caps of firearm optical sighting systems, the replacement cap having control circuitry, one or more solar cells and a threaded surface operationally configured for use as a direct replacement to OE and other battery caps and coin cell batteries of known third-party firearm optical sighting systems.

In another embodiment, the present disclosure provides a solar powered replacement cap for battery caps of coin cell battery powered third-party firearm optical sighting systems operable for use in dark conditions and low light conditions in indoor locations or spaces and outdoor in low light and nighttime conditions.

In another embodiment, the present disclosure provides a solar powered firearm optical sighting system including a first removable cap type member comprising one or more solar cells. The removable cap type member may be replaced with a second removable cap type member comprising a different number and/or type of solar cells than the first removable cap type member. The removable cap type member may also be replaced with a second removable cap type member comprising a different electrical energy storage device.

To better understand the novelty of the invention, reference is hereafter made to the accompanying drawings. In general, the present disclosure is directed to a power source for firearm optical sighting systems including, but not necessarily limited to rifle scopes 5 (see FIG. 1), red dot scopes 6 (see FIG. 2) and prism scopes 7 (see FIG. 3). In one implementation, the power source of this disclosure may include an electrical power source such as a photovoltaic cell (hereafter "solar cell") operationally configured to power an optical sighting system. In another implementation, the power source of this disclosure may include a solar cell and battery combination. In another implementation, the power source of this disclosure may include a solar cell and capacitor combination. In one embodiment, the present disclosure may be directed to a power source operable as a replacement power source or substitute power source for third-party firearm optical sighting systems that are powered by removable coin cell batteries. As described below, a power source of this disclosure may be configured for use with battery compartments of third-party firearm optical sighting systems 5, 6, 7 as a direct replacement for the battery cap and coin cell battery of such firearm optical sighting systems 5, 6, 7.

With reference to FIGS. 1-8, commercially available third-party firearm optical sighting systems 5, 6, and 7 (hereafter "optical sighting systems 5, 6, 7") at the time of this disclosure are typically equipped with a power input system including (1) a battery compartment 10 (or battery holder) and (2) a removable OE battery cap 15 for securing a coin cell battery 35 within the battery compartment 10 in a manner effective for the coin cell battery 35 to provide electrical power to the optical sighting systems 5, 6, 7, e.g., the coin cell battery 35 acts as a power source for a light source such as an LED light source or LED array light source.

As depicted, common battery compartments 10 are provided having a knob or turret type appearance including a cylindrical inner surface for housing circular coin cell batteries 35 therein (see the coin cell battery 35 in FIG. 5) and a corresponding OE battery cap 15 effective to cover the coin cell battery 35. As known in the art of optical sighting systems, a typical OE battery cap 15 includes a circular threaded surface 16 (see FIG. 4) for threadably mating with a threaded surface 11 of the battery compartment 10 (see FIG. 5) thereby allowing the OE battery cap 15 to be screwed on and off of the battery compartment 10 as desired. In regard to common commercially available firearm type optical sighting systems 5, 6, 7, a threaded surface 11 of the battery compartment 10 typically has an inner thread diameter of or about 22.0 mm (0.87 inches) to or about 26.0 mm (1.02 inches).

Depending on the make or model of a particular third-party optical sighting system 5, 6, 7, some battery compartments 10 may also include one or more rotary dials 20 (see FIG. 2) operationally configured to control one or more functions of the optical sighting system 5, 6, 7, e.g., (1) to adjust brightness for illuminating a corresponding reticle of the optical sighting system; and/or (2) to turn the optical sighting system ON/OFF. In such embodiments, the OE battery cap 15 typically has an outer perimeter surface 17 the same or substantially similar in appearance and/or outer diameter as the outer surface of all or a portion of the battery compartment 10 providing an aesthetically consistent exterior look and ease of manual operation of the rotary dial 20 and OE battery cap 15. For example, the outer surface of the battery compartment 10 and OE battery cap 15 may include corresponding raised surfaces 12 for ease of finger manipulation (see FIG. 3). Other optical sighting systems may include a raised and/or textured surfaces such as raised bumps, dimples, grooves, knurling as such terms are understood by the skilled artisan. With attention to FIGS. 1-4, the outermost surface of common OE battery caps 15 are substantially planar in appearance and may include a slotted surface 19 for receiving a tool such as a manufacturer provided tool, screwdriver, or the like therein to assist in turning the OE battery cap 15 both clockwise and counter-clockwise when screwing the OE battery cap 15 ON and OFF of a corresponding battery compartment 10. As understood by the skilled artisan, a common OE battery cap 15 includes a slotted surface 19 with a size effective to receive part of a coin therein, e.g., a United States penny, quarter, nickel, dime, and the like to assist in turning the OE battery cap 15. As such, a slotted surface 19 of an OE battery cap 15 is commonly referred to in the art as a "coin-slot."

Figure 7:
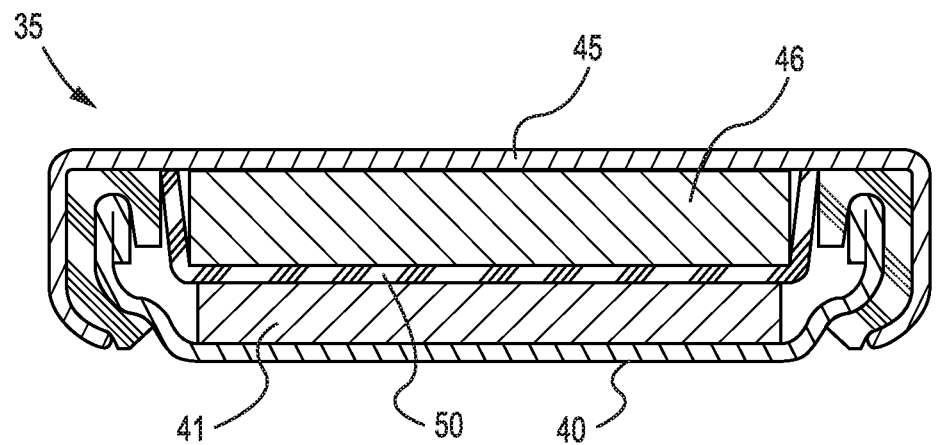
FIG. 7 is a sectional side view of an embodiment of a coin cell battery operable with a third-party firearm optical sighting system as shown in FIGS. 1-3.

Coin cell batteries 35 operable for powering third-party optical sighting systems 5, 6, 7 are typically of the conventional type as shown in the simplified illustration of FIG. 7, including an anode case 40, an anode 41, a cathode case 45, a cathode 46 and a separator 50 disposed between the anode 41 and cathode 46. In this embodiment, the anode case 40 forms the negative terminal and the cathode case 45 forms the positive terminal of the coin cell battery 35. The orientation of a coin cell battery 35 within a battery compartment 10 is suitably determined according to the orientation of the electric contacts within the battery compartment 10, e.g., see FIG. 5, which includes a coin cell battery 35 with the positive cathode case 45 side of the coin cell battery 35 facing outward.

Typical coin cell batteries 35 for third-party optical sighting systems 5, 6, 7, include a diameter of or about 16.0 mm to or about 20 mm and a height (or thickness) of or about 3.2 mm or as otherwise desired according to operational power and/or size requirements of the optical sighting systems 5, 6, 7. One exemplary coin cell battery 35 for use with third-party optical sighting systems 5, 6, 7 includes a lithium coin cell battery such as the CR2032 coin cell lithium battery with specifications as shown in Table 1 and the CR1632 coin cell lithium battery with specifications as shown in Table 2. Another exemplary coin cell battery 35 used for third-party optical sighting systems 5, 6, 7, includes a LR44/AG13 alkaline zinc manganese coin cell battery.

TABLE 1

| | |
|---|---|
| Capacity: | 225.0 mAh |
| Chemical System: | Lithium Manganese Dioxide |
| Dimensions: | 20.0 mm × 3.2 mm |
| Operating Temperature: | −30.0 to 60.0° C. |
| Weight: | 2.9 g |
| Voltage Rating: | 3 V. |

TABLE 2

| | |
|---|---|
| Capacity: | 140.0 mAh |
| Chemical System: | Lithium Manganese Dioxide |
| Dimensions: | 16.0 mm × 2.0 mm |
| Operating Temperature: | −30.0 to 60.0° C. |
| Weight: | 1.8 g |
| Voltage Rating: | 3 V. |

Figure 2:
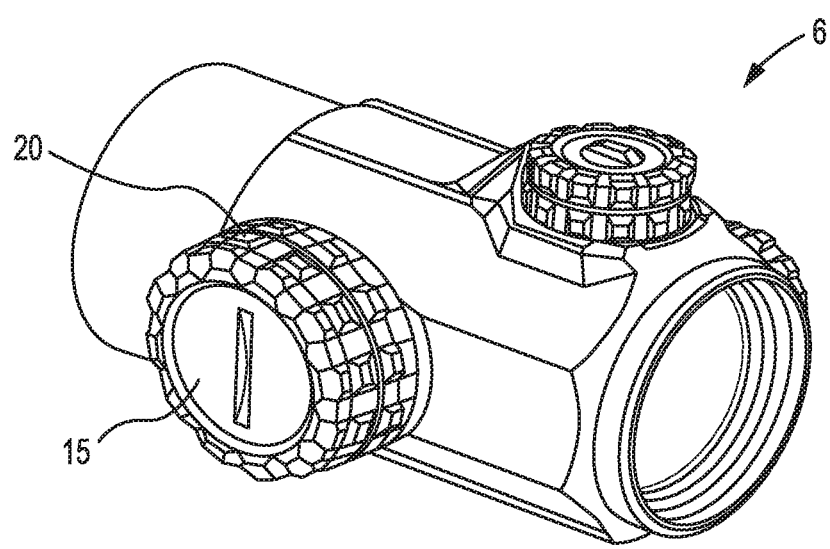
FIG. 2 is a top perspective view of another exemplary third-party firearm optical sighting system commercially available at the time of this disclosure.
Figure 3:
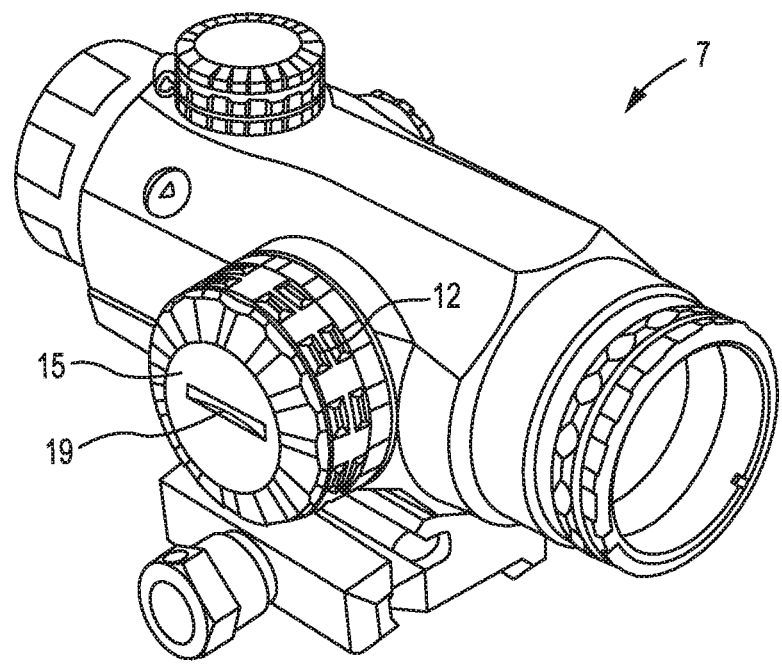
FIG. 3 is a top perspective view of another exemplary third-party firearm optical sighting system commercially available at the time of this disclosure.
Figure 4:
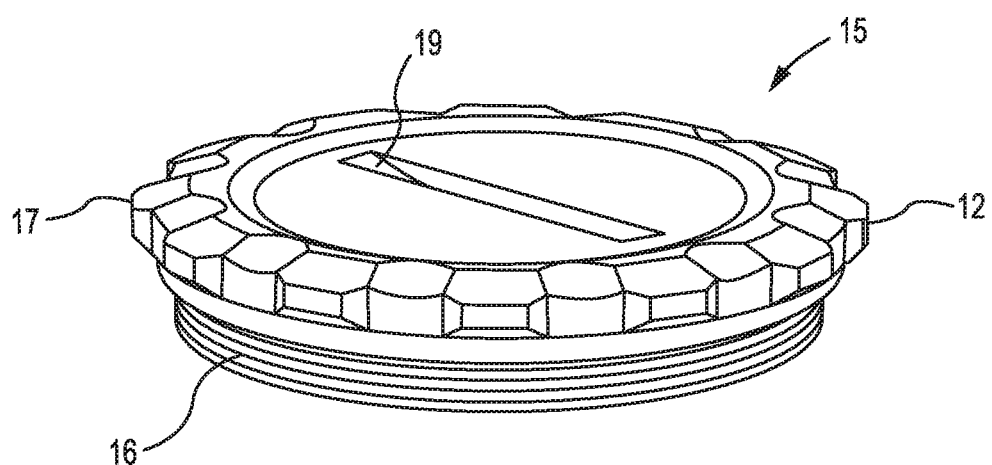
FIG. 4 is a perspective view of an exemplary battery cap of a battery compartment of a third-party firearm optical sighting system such as the third-party firearm optical sighting systems of FIGS. 1-3.
Figure 5:
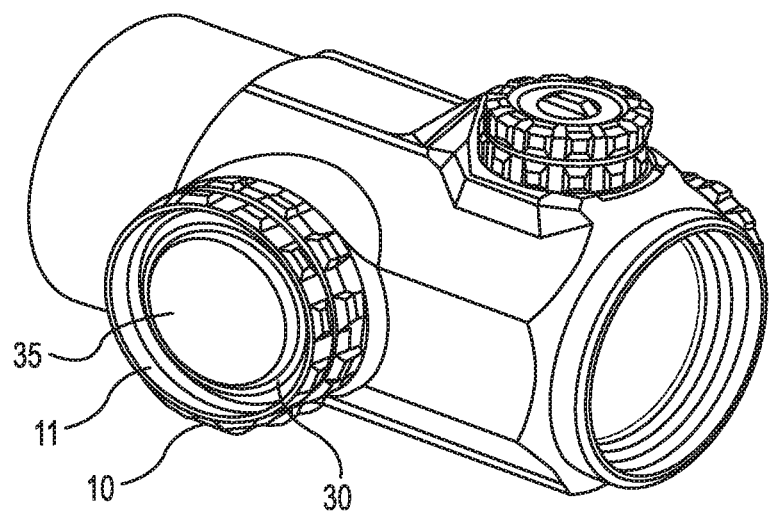
FIG. 5 is another top perspective view of the third-party firearm optical sighting system of FIG. 2 with its battery cap removed exposing a coin cell battery within a battery compartment.
Figure 6:
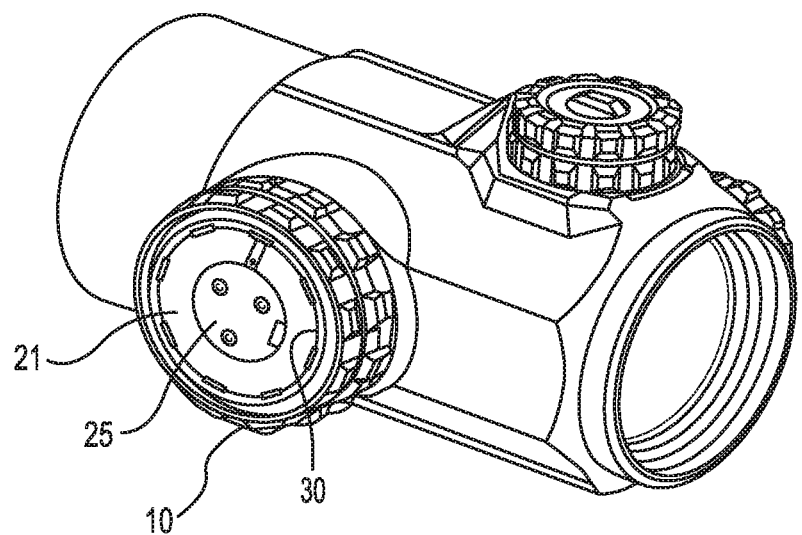
FIG. 6 is another top perspective view of the third-party firearm optical sighting system of FIG. 2 with its battery cap and coin cell battery removed.
Figure 8:
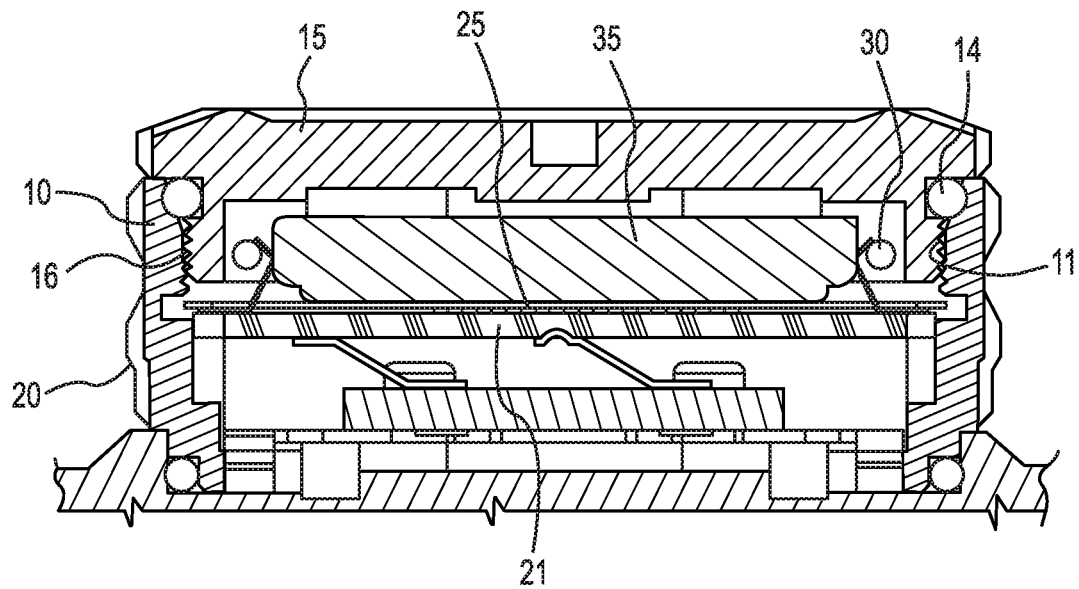
FIG. 8 is an exemplary sectional side view of a battery compartment of a third-party firearm optical sighting system as shown in FIGS. 1-3 including a coin cell battery housed therein and a battery cap attached thereto.

Referring to FIG. 5, third-party battery compartments 10 are suitably provided with sufficient space to hold a particular size coin cell battery 35 therein without hindering the OE battery cap 15 from being properly secured to the battery compartment 10 as shown in FIGS. 1-3. With reference to FIG. 6, a common third-party battery compartment 10 includes a floor 21 with a negative contact 25, e.g., a negative contact plate 25, for contacting an anode case 40 of a coin cell battery 35 and a positive contact (shown as a positive contact ring 30) operationally configured to contact a cathode case 45 of a coin cell battery 35 along the perimeter of a coin cell battery 35 to complete an electric circuit, thereby providing power to an LED or LED array and electronics of a third-party optical sighting system 5, 6, 7. Referring to FIG. 8, a battery compartment 10 may also include a seal such as an O-ring 14 as shown to prevent moisture and/or dirt from entering the battery compartment 10 during use. When an OE battery cap 15 is turned to a desired tightened position, the inner surface of the OE battery cap 15 (1) applies a force to the coin cell battery 35 maintaining proper contact of the coin cell battery 35 with the negative and positive contacts 25, 30 and (2) applies a force to the OE battery cap 15 to form a seal with the O-ring 14.

In one embodiment, the present disclosure is directed to modifying a power source of a third-party optical sighting system 5, 6, 7 as described above by replacing the OE battery cap 15 and coin cell battery 35 with a solar powered cap assembly operationally configured to electrically communicate with a battery compartment 10 of a third-party optical sighting system 5, 6, 7 in a manner effective to power a third-party optical sighting system 5, 6, 7. In another embodiment, the present disclosure is directed to an OE solar powered battery cap assembly for one or more firearm optical sighting systems, including but not necessarily limited to optical sighting systems comprising illuminated reticles.

Figure 9:
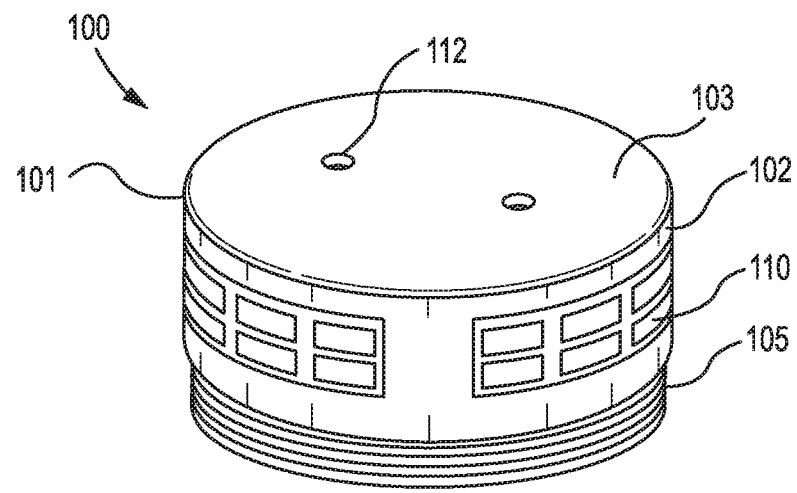
FIG. 9 is a top perspective view of an embodiment of a solar powered cap assembly of the present disclosure.
Figure 10:
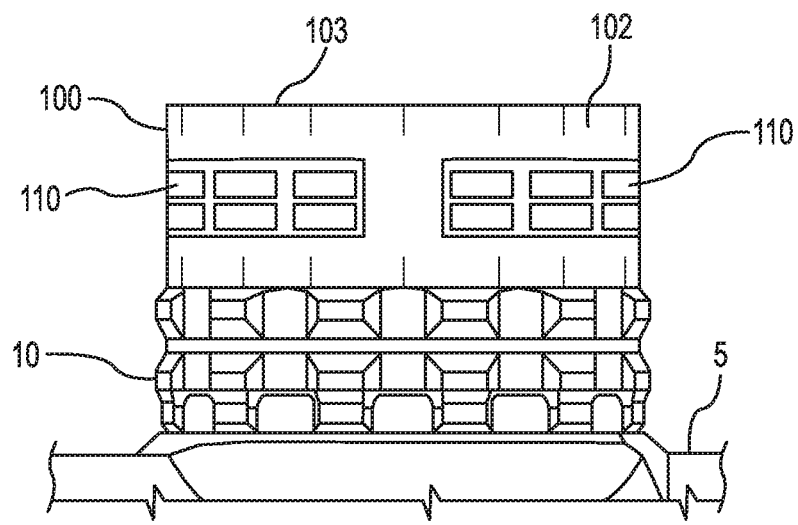
FIG. 10 is a side view of an embodiment of a solar powered cap assembly secured to a battery compartment of an exemplary third-party firearm optical sighting system as shown in FIGS. 1-3.

With reference to FIGS. 9 and 10, one exemplary solar powered cap assembly 100 (hereafter "cap assembly 100") may include a threaded housing or threaded cylindrical member 101 defined by an outer perimeter surface 102, an outer surface 103, and a threaded surface 105 operationally configured to mate with a threaded surface 11 of a battery compartment 10, e.g., a third-party battery compartment 10 in a manner similar as a corresponding OE battery cap 15 of a battery compartment 10. As shown in FIG. 10, a cap assembly 100 of this embodiment may include an outer diameter the same or substantially similar as the outer diameter of a corresponding battery compartment 10. In another embodiment, the cap assembly 100 may include an outer diameter greater than the outer diameter of a corresponding battery compartment 10. Similar as described above, the outer surface 103 of the cap assembly 100 may include one or more slotted surfaces 119 (one or more coin-slots) to assist in turning the cap assembly 100 both clockwise and counter-clockwise about a threaded surface 11 of a battery compartment.

The cap assembly 100 of this disclosure may be built to scale and configured as may be required for operation in regard to one or more optical sighting systems including one or more particular third-party optical sighting systems 5, 6, 7. Without limiting the invention, one exemplary cap assembly 100 suitable for use with a third-party optical sighting system 5, 6, 7 as shown in FIGS. 1-3 may include the dimensions as listed in Table 3:

TABLE 3

| Outer Diameter of the Outer Perimeter Surface 102: | 20.0 mm to 30.0 mm |
| Outer Diameter of the Threaded Surface 105: | 18.0 mm to 28.0 mm |
| Total Height of the Cap Assembly 100: | 4.0 mm to 8.0 mm. |

In another exemplary embodiment of a cap assembly 100 operationally configured for use with a micro red dot optic such as the Aimpoint® T-1 micro red dot scope commercially available from Aimpoint AB, located in Malmö, Sweden, the cap assembly 100 includes the dimensions as listed in Table 4:

TABLE 4

| Outer Diameter of the Outer Perimeter Surface 102: | 26.57 mm |
| Outer Diameter of the Threaded Surface 105: | 24.85 mm |
| Total Height of the Cap Assembly 100: | 6.0 mm. |

Similar as an OE battery cap 15, the cap assembly 100 of the present disclosure may include a raised and/or textured outer perimeter surface 102 providing an ornamental exterior appearance as desired, including an aesthetically consistent exterior appearance as one or more target third-party battery compartments 10. As such, the cap assembly 100 may be provided in any number of outer perimeter surface 102 configurations corresponding to one or more particular third-party battery compartments 10. In other words, the cap assembly 100 may be provided as an after-market item operationally configured for use with one or more particular third-party optical sighting systems 5, 6, 7.

In another embodiment, the cap assembly 100 may include an outer perimeter surface 102 operationally configured for use with a plurality of third-party battery compartments 10 of varying exterior surfaces. For example, a cap assembly 100 may include a smooth outer perimeter surface 102 providing a neutral type aesthetic exterior for use with a plurality of third-party battery compartment 10 of varying exterior surfaces. As understood by the skilled artisan, optical sighting systems are often provided in the color black, silver, army green or olive drab ("OD") green, a color often referred to as "flat dark earth" and one of a plurality of camouflage patterns. As such, the cap assembly 100 of this disclosure may be provided with an exterior including an outer perimeter surface 102 and/or an outer surface 103 and/or a threaded surface 105 with any color or color combination including one or more of the above colors or a particular camouflage pattern for use with one or more particular color or camouflage patterned third-party optical sighting systems 5, 6, 7.

As understood by the skilled artisan, third-party optical sighting system OE battery caps 15 and battery compartments 10, including rotary dials 20, are typically constructed of one or more materials such as one or more metals, plastics, and combinations thereof. Exemplary metals include machined metal or cast metal including aluminum, steel, various alloys, and combinations thereof. Also, a battery compartment 10 and/or OE battery cap 15 constructed of one or more metals may include a chrome finish as desired. Exemplary plastics include one or more injection molded polymers. Accordingly, the cap assembly 100 of the present disclosure may be constructed of one or more of the above described materials including the same or similar material(s) as one or more particular third-party battery compartments 10.

Figure 16:
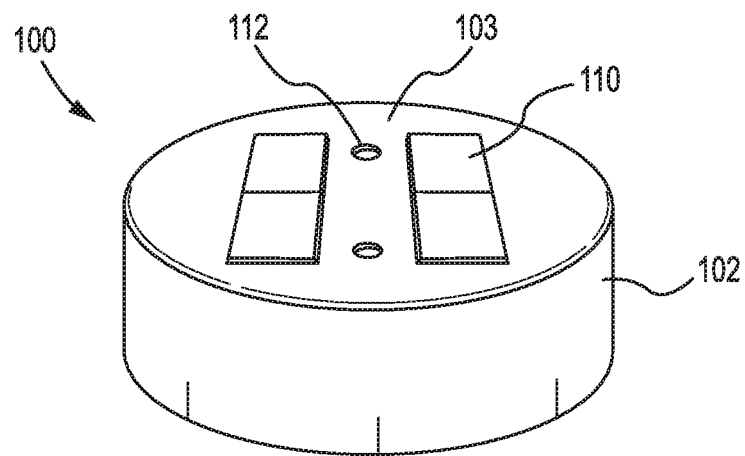
FIG. 16 is a top perspective view of a simplified embodiment of a solar powered cap assembly of the present disclosure.

Suitably, the cap assembly 100 is provided with solar energy harvesting technology, e.g., one or more photovoltaic cells, operationally configured to provide electrical power to a corresponding optical sighting system including an OE optical sighting system and/or a third-party optical sighting system 5, 6, 7. In one embodiment, the outer surface of the cap assembly 100, e.g., the outer perimeter surface 102 and/or the outer surface 103, is configured as a substrate for the placement of one or more photovoltaic cells (hereafter "one or more solar cells 110") that are operationally configured to convert light energy into electrical energy for powering electrical components including, but not necessarily limited to LEDs and/or other components of an OE optical sighting system and/or a third-party optical sighting system 5, 6, 7. In one embodiment, one or more solar cells 110 may be located on the outer perimeter surface 102 of the cap assembly 100, e.g., see FIGS. 9-11. In another embodiment, one or more solar cells 110 may be located on an outer surface 103 of a cap assembly 100 (see FIG. 16). In still another embodiment, one or more solar cells 110 may be located on both the outer surface 103 and the outer perimeter surface 102 of the cap assembly 100. In one embodiment, one or more solar cells 110 may be adhered to the outer perimeter surface 102 and/or outer surface 103.

Figure 11:
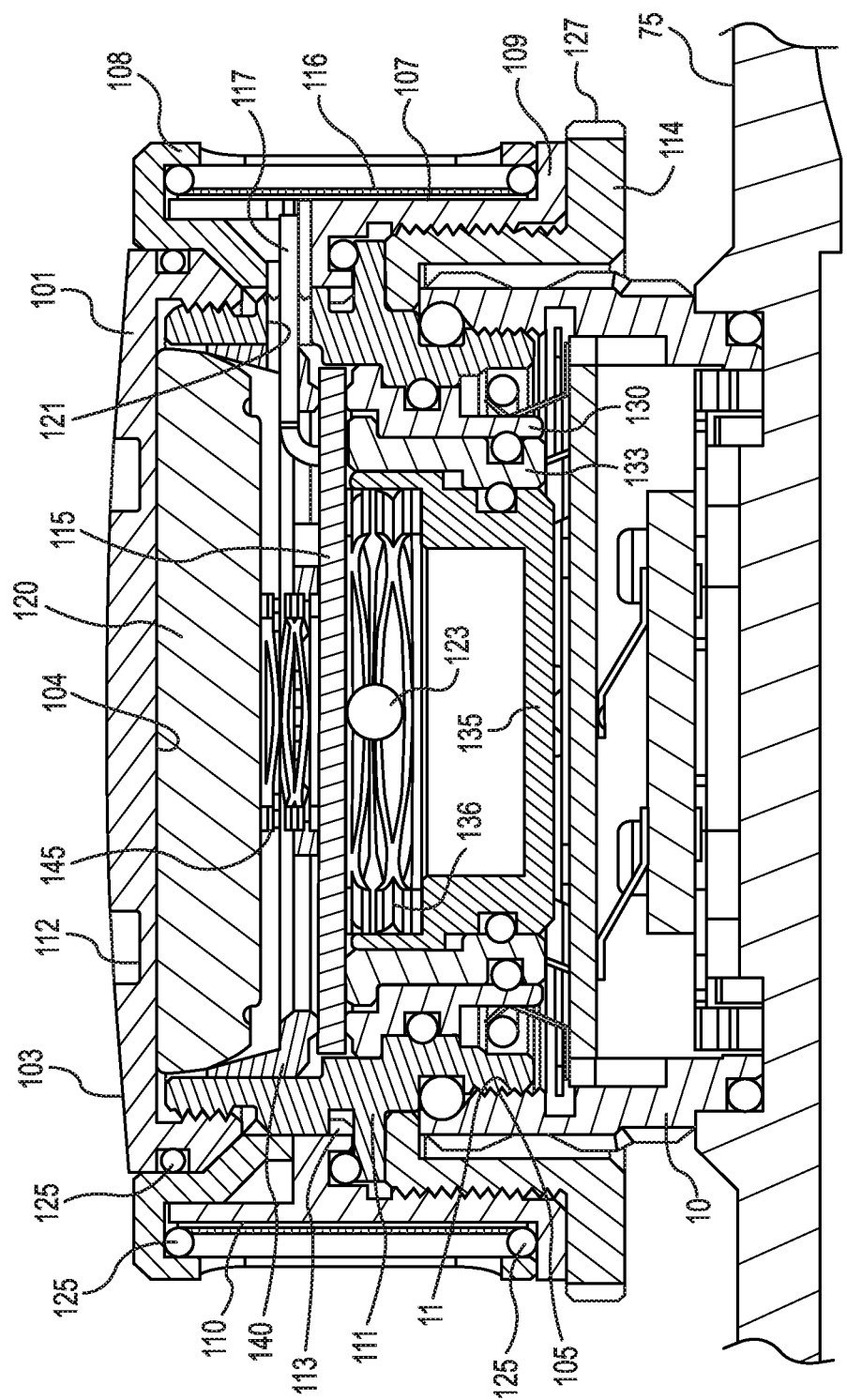
FIG. 11 is a sectional side view of an embodiment of a solar powered cap assembly of the present disclosure.
Figure 17:
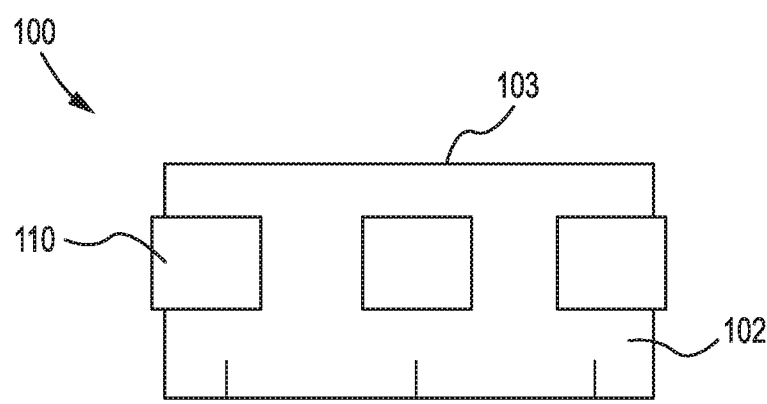
FIG. 17 is a side view of a simplified embodiment of a solar powered cap assembly of the present disclosure.

As shown in the embodiment of FIG. 17 including a smooth cylindrical outer perimeter surface 102, one or more solar cells 110 may be mounted to the outer perimeter surface 102 in a raised orientation according to the height or thickness of the one or more solar cells 110. In the embodiment of FIGS. 9-11, the outer perimeter surface 102 of the cap assembly 100 includes one or more recessed surfaces 107 operable as one or more mounting surfaces for one or more solar cells 110 wherein the outer surface of the one or more solar cells 110 may terminate at or about equal to the outer perimeter surface 102. A cap assembly 100 is described below in terms of having one or more solar cells 110 disposed along its outer perimeter surface 102 as provided in the embodiment of FIGS. 9-11.

Without limiting the invention, solar cells 110 for use as part of the present cap assembly 100 are suitably operationally configured to utilize ambient light, both natural and artificial ambient light. Suitable solar cells 110 include, but are not necessarily limited to one or more thin-film and/or flexible thin-film photovoltaic solar cells, including, but not necessarily limited to monocrystalline thin-film solar cells, cadmium telluride thin-film solar cells, copper indium gallium selenide ("CIGS") thin-film solar cells, gallium arsenide thin-film solar cells, amorphous silicon thin-film solar cells, and combinations thereof. Suitable solar cells 110 may also include one or more wafer-based solar cells such as crystalline silicon photovoltaics, e.g., monocrystalline silicon, polycrystalline silicon.

Suitably, the one or more solar cells 110 of the cap assembly 100 are operationally configured to produce a voltage or charging voltage effective for powering one or more LEDs of optical sighting systems including third-party optical sighting systems 5, 6, 7. Without limiting the present disclosure, any charging voltage may be employed whereby the output voltage may be regulated by way of a control assembly including a printed circuit board ("PCB 115") described below. As understood by the skilled artisan, the size of the cap assembly 100, including the size and number of LEDs may determine the current output of the one or more solar cells 100 of the cap assembly 100. In addition, the size and thickness of the one or more solar cells 110 employed may vary but may be provided in a number and size/thickness as few and as small as possible to meet the operating demands of a particular cap assembly 100 and/or operating demands of one or more optical sighting systems including one or more third-party optical sighting systems 5, 6, 7. Without limiting the invention, a suitable thickness of the one or more solar cells 110 may range from or about 0.2 mm to or about 2.0 mm. For purposes of this disclosure, the one or more solar cells 100 may include an operating temperature range of or about −40.0 to 80.0° C.

One non-limiting example of a solar cell 110 for use with a cap assembly 100 of the present disclosure may include a flexible thin-film CIGS solar cell commercially available from PowerFilm Solar Inc., located in Ames, Iowa, U.S.A. Also, the total number of solar cells 110 employed for a particular cap assembly 100 may vary as desired or as otherwise required for effective operation of an optical sighting system including one or more target third-party optical sighting systems 5, 6, 7. As an example, a suitable number of flexible thin-film CIGS solar cells 110 for operation of the Aimpoint® T-1 micro red dot scope may range from one to ten (1.0 to 10.0) solar cells 110, the one or more solar cells 110 being mounted within one or more recessed surfaces 107 via optically clear epoxy and/or mechanically via screws and/or retaining rings.

With reference to FIGS. 11-15, a cap assembly 100 of this disclosure may include a housing including a (1) main housing body 111 and (2) a main housing cover or main retainer 101 in communication with the main housing body 111, the main housing being operationally configured to enclose the electrical components of the cap assembly 100 (see FIG. 11). In this embodiment, the main retainer 101 is defined by an outer surface 103 with one or more tooling holes or tooling cavities 112 operationally configured to receive a tool therein to assist in assembly of the cap assembly 100 including installation of the main retainer 101. In another embodiment, the outer surface 103 may include one or more slotted surfaces 19 as described above, or other feature, to assist with installation of the cap assembly 100 on to and off from an optical sighting system. The main retainer 101 also includes an inner surface 104 providing an abutment surface for one or more one electrical energy storage devices 120. In one embodiment, the main retainer 101 and the main housing body 111 may be constructed of one or more durable lightweight materials including, but not necessarily limited to one or more metals, one or more plastics, one or more composite materials, and combinations thereof. Suitable metals include, but are not necessarily limited to aluminum alloy, magnesium alloy, titanium, and combinations thereof. Suitable composite materials include, but are not necessarily limited to glass-filled polymer, e.g., glass-filled nylon.

The cap assembly 100 further includes an outer sleeve 108 and a seat ring 109 encircling the main retainer 101 and defining an outer perimeter surface of the cap assembly 100, wherein the outer sleeve 108 and the seat ring 109 collectively makeup an outer perimeter surface 102 spaced apart from one or more recessed surfaces 107 along the outer perimeter of the cap assembly 100. Suitably, the main housing 111, the outer sleeve 108 and the seat ring 109 include corresponding splines 113 as seen in FIG. 11 that are operationally configured to hold the main housing 111, the outer sleeve 108 and the seat ring 109 in a fixed position thereby preventing rotation of the outer sleeve 108 and the seat ring 109. In addition, the main housing 111, the outer sleeve 108 and the seat ring 109 include cutout sections providing one or more sealed apertures 121 as discussed below, wherein the splines 113 facilitate the alignment of the cutout sections during assembly of the cap assembly 100. The cap assembly 100 also includes a locking ring 114 in threaded communication with the seat ring 109. In operation, once a cap assembly 100 is installed onto a battery compartment 10, the locking ring 114 may be turned clockwise thereby tightening the locking ring 114 in a manner effective to set the cap assembly 10 at a fixed position or locked position. In one embodiment, the locking ring 114 may be operationally configured to set the cap assembly 100 at a fixed position or locked position against a rotary dial 20 of a battery compartment 10. In another embodiment, the locking ring 114 may include one or more apertures for receiving fasteners there through, e.g., set screws, effective for holding the locking ring 114 in a fixed position about a battery compartment 10. In one embodiment the outer sleeve 108, the seat ring 109 and the locking ring 114 may be constructed of one or more durable lightweight materials including, but not necessarily limited to one or more metals, one or more plastics, one or more composite materials, and combinations thereof. Suitable metals include, but are not necessarily limited to aluminum alloy, magnesium alloy, titanium, and combinations thereof. Suitable composite materials include, but are not necessarily limited to glass-filled polymer, e.g., glass-filled nylon.

With further reference to FIG. 11, the one or more solar cells 110 are provided as one or more strips of solar cells 110 disposed up to 360.0 degrees around a recessed surface 107 of the cap assembly 100. The cap assembly 100 also includes a thin-walled transparent or substantially transparent cover 116 provided as a ring type member disposed over the one or more strips of solar cells 110 in a manner effective to allow ambient light to pass there through. The cover 116 is also operationally configured to protect the one or more strips of solar cells 110 from physical impacts and from weathering via seals 125 located between the cover 116 and the outer sleeve 108 and the seat ring 109 as shown. In one embodiment, the cover 116 may be constructed of transparent glass. In another embodiment, the cover 116 may be constructed of transparent plastic. In another embodiment, a plurality of covers 116 may be employed, each cover 116 corresponding to distinct one or more strips of solar cells 110. Suitably, the outer sleeve 108 and seat ring 109 are operationally configured to form one or more cavities, compartments or slot type spaces operationally configured to receive and hold one or more strips of solar cells 110 and one or more covers 116 therein. As further shown, the cap assembly 100 also includes an outer sleeve 108 defined by a plurality of cutout sections (see FIG. 12) operationally configured to protect the cover 116 from physical impacts.

In addition, the one or more solar cells 110 are electrically communicated to control circuitry housed within the cap assembly 100. Suitable control circuitry may include, but is not necessarily limited to one or more printed circuit boards ("PCB 115") including a patterned arrangement of printed circuitry, PCB components mounted to the surface of the PCB 115 and connectors for operation of the cap assembly 100. As shown in FIG. 11, a PCB 115 may be attached directly to an inner surface of the main housing 111 via one or more fasteners, one or more adhesives, and combinations thereof. In another embodiment, the PCB 115 may be attached to a support member such as a support plate or support frame that is secured to the main housing 111. As further depicted in FIG. 11, the PCB 115 may be electrically communicated with one or more solar cells 110 via a positive contact and a negative contact disposed through one or more sealed apertures 121 of the cap assembly 100, e.g., see current input 117 and output 122 electrically communicating the PCB 115 with the one or more solar cells 110. In one embodiment, the input 117 may be electrically communicated with a micro control unit ("MCU 118") or a diode of the PCB 115. In one embodiment, an input 117 and/or output 122 may be comprised of electric wire.

The PCB 115 is further electrically communicated with at least one electrical energy storage device 120 (hereafter "internal storage device 120") operationally configured to store electrical energy for use by a corresponding optical sighting system. In one embodiment, the internal storage device 120 may be connected to the PCB 115 using one or more flex circuits or electrical contacts. In one embodiment the internal storage device 120 may be rechargeable, e.g., comprise one or more rechargeable batteries, including but not necessarily limited to, one or more lithium-ion batteries, one or more lithium polymer ("LiPo") batteries, one or more nickel-cadmium ("NiCd") batteries, one or more lead-acid batteries, and combinations thereof. Suitably, when exposed to ambient light the average rate of current provided via the one or more solar cells 110 to the internal storage device 120 via the PCB 115 is greater than the required current for operating a corresponding optical sighting system when the optical sighting system is set at a maximum brightness setting. When the average current collected by the cap assembly 100 exceeds the power requirements of the optical sighting system according to a realized brightness setting, the optical sighting system may remain ON indefinitely or for a duration equal to the life of the operable components of the cap assembly 100 and/or the optical sighting system. As such, a cap assembly 100 of this disclosure eliminates the need to replace depleted coin cell batteries as is required for coin cell battery powered third-party optical sighting systems 5, 6, 7 as of the date of this disclosure. In addition to eliminating the need of any future coin cell battery purchases, the cap assembly 100 also eliminates, or at least greatly reduces, the risk of an optical sighting system becoming inoperable as a result of an otherwise dead battery, which is advantageous to users located in remote settings, e.g., hunters, soldiers. A suitable recharge rate for one or more rechargeable batteries may include, but is not necessarily limited to a range from or about 2.0 to 48.0 hours depending on the ambient light conditions including ambient indoor light conditions and ambient outdoor light conditions, e.g., bright light versus low light. As understood by the skilled artisan, the solar energy voltage of the one or more solar cells 110 is greater when exposed to bright light, e.g., ambient outdoor bright light at high noon. As such, the output voltage of the one or more solar cells 110 may start increasing from 0.0 volts (0.0V) when not exposed to light up to an output voltage equal to or greater than the output voltage of the cap assembly 100. In another embodiment, the internal storage device 120 may include a capacitor or an array of capacitors. In another embodiment, the internal storage device 120 may include a super-capacitor or an array of super-capacitors. In another embodiment, the internal storage device 120 may include a combination of one or more batteries, one or more capacitors and one or more super-capacitors.

Figure 13:
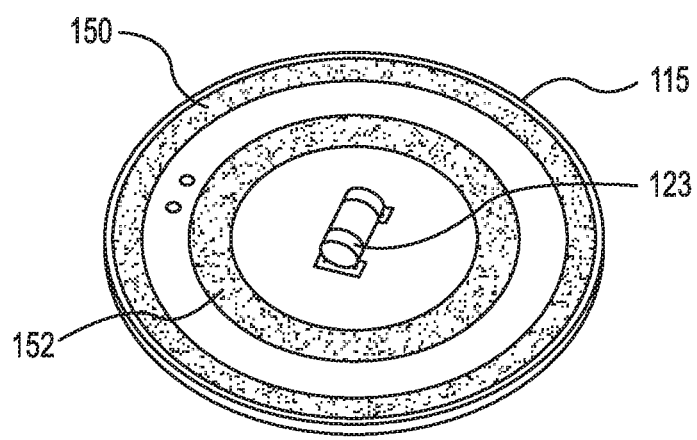
FIG. 13 is a bottom perspective view of the printed circuit board of FIG. 12.

Still referring to FIG. 11, the cap assembly 100 further includes an annular positive power output contact 130 and a negative power output contact 135. The positive power output contact 130 is electrically communicated with the PCB 115 via an exposed contact 150, e.g., a circular copper contact as shown in FIG. 13. In this embodiment, the positive power output contact 130 is effective as a seat for the PCB 115. The positive power output contact 130 is also electrically communicated with a positive contact of an optical sighting system, including one or more third-party optical sighting systems 5, 6, 7 (see the positive contact ring 30 in FIG. 6). Suitably, the negative power output contact 135 is electrically communicated with the PCB 115 by way of a negative power output spring contact 136 that is in electrical communication with an exposed contact 152, e.g., a circular copper contact as shown in FIG. 13, and is also electrically communicated with a negative contact of an optical sighting system, including one or more third-party optical sighting systems 5, 6, 7, (see the negative contact plate 25 in FIG. 6). Herein, the negative power output spring contact 136 is also operationally configured to bias the negative power output contact 135 toward a negative contact of an optical sighting system, e.g., negative contact plate 25, to insure a proper connection with a negative contact and operate as a spacer for height tolerance of the cap assembly 100. In another embodiment, the positive power output contact 130 may be communicated with the PCB 115 via leads including electric wires or other connectors such as flex circuits.

Figure 18:
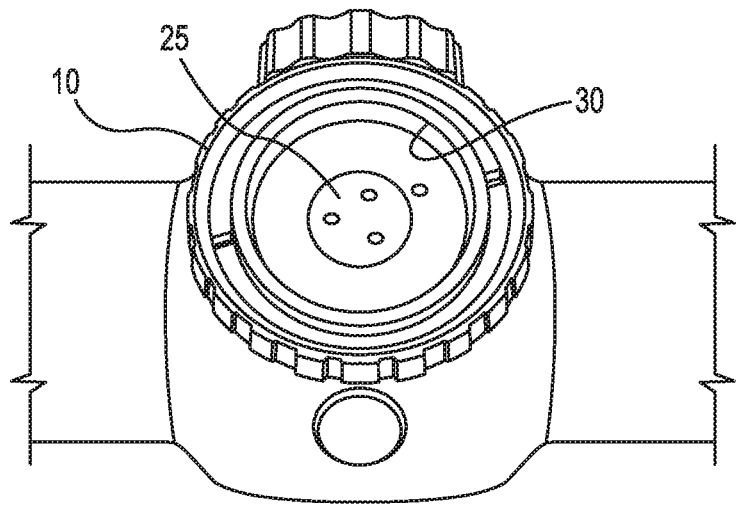
FIG. 18 is a perspective view of an embodiment of a battery compartment of a third-party firearm optical sighting system commercially available at the time of this disclosure.
Figure 19:
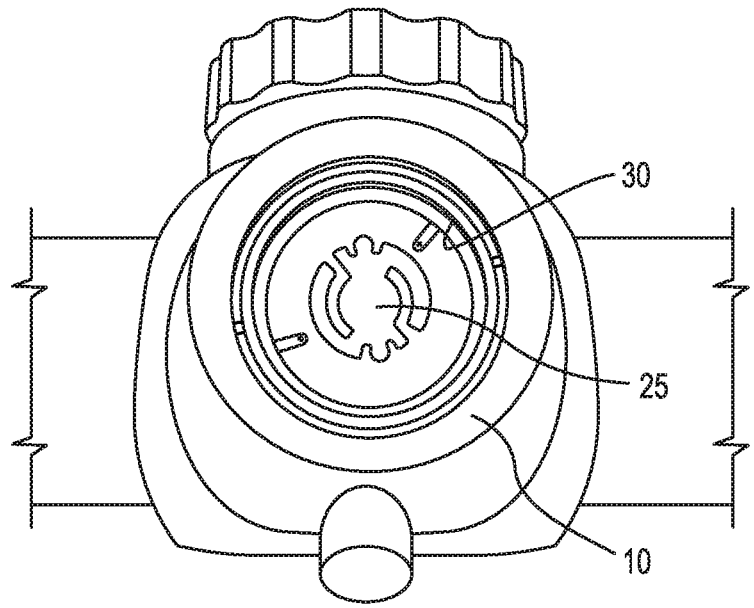
FIG. 19 is a perspective view of another embodiment of a battery compartment of a third-party firearm optical sighting system commercially available at the time of this disclosure.

In an embodiment as provided in FIG. 11, the positive power output contact 130 and the negative power output contact 135 may each be constructed of one or more electrically conductive materials including, but not necessarily limited to brass, copper, tin, aluminum, and combinations thereof, which may also be coated with one or more electrically conductive coatings, e.g., gold, nickel, copper, and combinations thereof. As shown, the cap assembly 100 may also include a power output insulating ring 133 disposed between the positive power output contact 130 and the negative power output contact 135. A suitable power output insulating ring 133 may be constructed of one or more nonconductive or non-electrically conductive materials, e.g., one or more plastics. In this embodiment, the power output insulating ring 133 is operationally configured to separate the positive power output contact 130 from the negative power output contact 135 without allowing current there through, act as a seal between the positive power output contact 130 and the negative power output contact 135, and provide a riding surface for the negative power output contact 135 to assist in retaining the negative power output contact 135 in a desired position. As shown, the positive power output contact 130, the negative power output contact 135 and the power output insulating ring 133 are located within the main housing 111. As understood by the skilled artisan, the size and/or configuration of the positive power output contact 130, the negative power output contact 135 and power output insulating ring 133 may vary according to the configuration of the positive and negative contacts of one or more target battery compartments 10. In addition, to FIG. 6, exemplary battery compartments 10 including exemplary types of negative contacts 25 of third-party optical sighting systems 5, 6, 7 are provided in FIGS. 18 and 19.

Still referring to FIG. 11, the cap assembly 100 includes an annular positive contact 140 between the internal storage device 120 and the PCB 115 and a negative contact 145 between the internal storage device 120 and the PCB 115, e.g., a negative contact 145 electrically connected to the PCB 115. As shown, the negative contact 145 may be concentrically aligned with the annular positive contact 140 (see also FIG. 12). Suitably, the negative contact 145 includes a height effective as a spacer for a snug type fit of an internal storage device 120. As such, the size and/or shape of the negative contact and/or the size and/or shape of the internal storage device 120 may vary as desired for one or more embodiments of a cap assembly 100. In the embodiment of FIG. 11, a positive contact 140 and a negative contact 145 may be constructed of one or more electrically conductive materials including, but not necessarily limited to brass, copper, aluminum, and combinations thereof, which may also be coated with one or more electrically conductive coatings, e.g., gold, nickel, copper, and combinations thereof.

Figure 14:
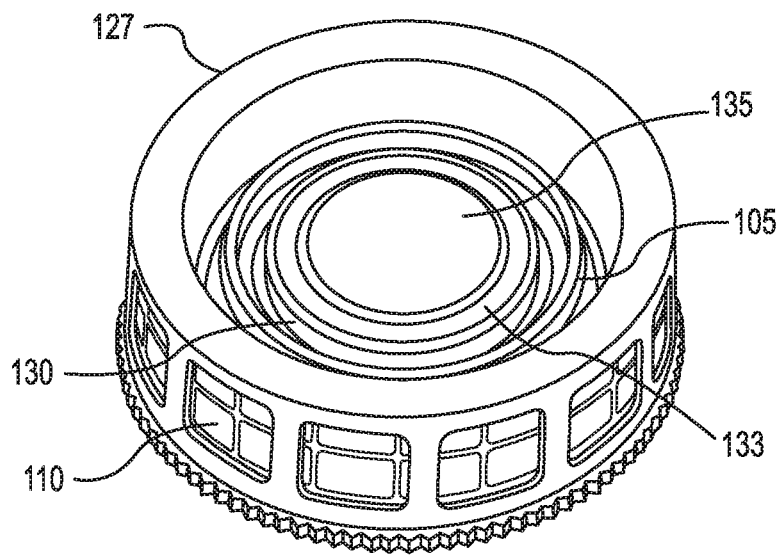
FIG. 14 is a bottom perspective view of the solar powered cap assembly of FIG. 11.
Figure 15:
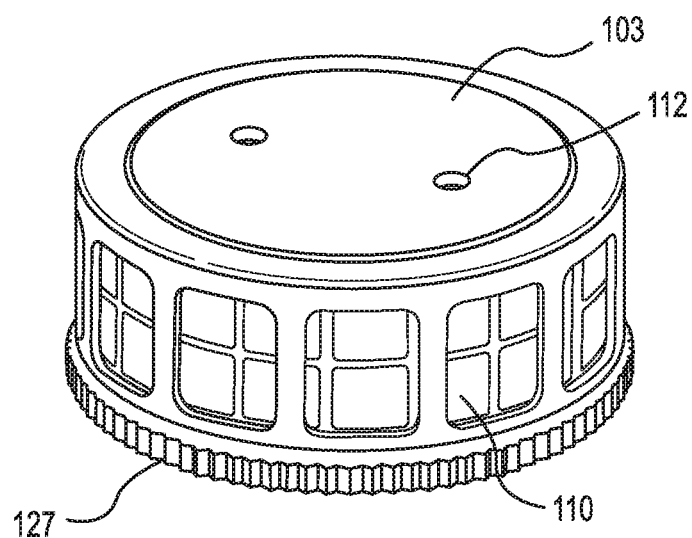
FIG. 15 is a top perspective view of the solar powered cap assembly of FIG. 14.

In operation, the threaded surface 105 of the cap assembly 100 may be screwed onto a threaded surface 11 of an optical sighting system by manually turning the locking ring 114 in a clockwise direction. As shown in FIGS. 14 and 15, the locking ring 114 may include an outer perimeter textured contact surface 127, e.g., splines, knurling or the like, for ease of finger manipulation of the locking ring 114. As the cap assembly 100 is screwed onto an optical sighting system, the positive power output contact 130 and the negative power output contact 135 are suitably directed to a contact position with input contacts of an optical sighting system, e.g., a positive contact ring 30 and a negative contact 25 of an optical sighting system (see the positive contact rings 30 and a negative contacts 25 in FIGS. 18 and 19). In operation, the PCB 115 is operationally configured to feed electricity at a controlled voltage and controlled rate into an optical sighting system via the positive contact ring 30 and the negative contact 25 for powering the optical sighting system. In use with third-party optical sighting systems 5, 6, 7, the PCB 115 is operationally configured to feed electrical power at a controlled voltage and controlled rate to a positive contact ring 30 and negative contact 25 of a battery compartment 10 in a manner effective to simulate a coin cell battery 35 (see FIG. 8).

The cap assembly may also include one or more seals 125 (see FIG. 11). When screwing the cap assembly 100 onto an optical sighting system, the one or more seals 125 are operationally configured to prevent moisture and/or dirt from entering the cap assembly 10 a corresponding optical sighting system including a battery compartment 10 of a third-party optical sighting systems 5, 6, 7 during operation of the cap assembly 100. In addition, the one or more seals 125 may assist in providing a secure fit of the cap assembly 100 when in threaded communication with an optical sighting system. One suitable seal 125 may include a rubber O-ring, gasket or the like.

Figure 12:
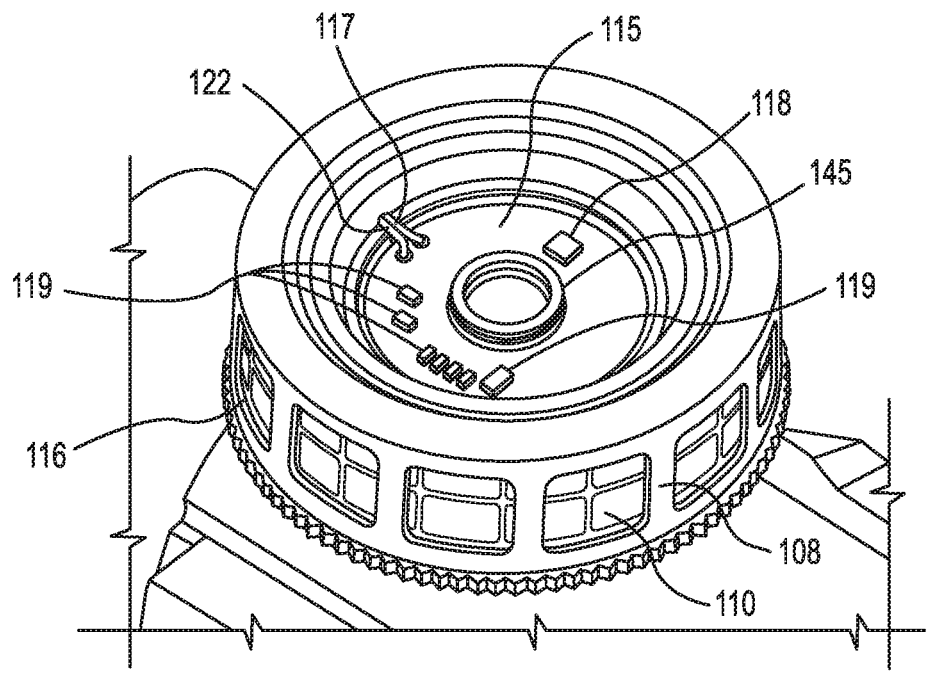
FIG. 12 is a top perspective view of the solar powered cap assembly of FIG. 11 with the top surface removed exposing a top surface of a printed circuit board of the solar powered cap assembly.

In one embodiment, the PCB 115 is operationally configured to control or regulate the output power, the output voltage, the rate of electric current, the charging current voltage and charging current rate of the internal storage device 120. The PCB 115 is also operationally configured to control the charging rate to the internal storage device 120 in a manner effective to not overcharge or overload the internal storage device 120. In one embodiment, the electrical circuit for each of the one or more solar cells 110 may include an analog circuit. In another embodiment, the electrical circuit for each of the one or more solar cells 110 may include a digital circuit. As shown in FIG. 12, one suitable PCB 115 may include a MCU 118 and one or more other PCB components 119, e.g., one or more voltage regulator circuits, one or more resistors, one or more capacitors, one or more relays, one or more transistors and other electrical components as may be required for a particular operation of a cap assembly 100 and corresponding optical sighting system. For example, one or more resistors may be provided on a PCB 115 operationally configured to control current output to an optical sighting system and current input into the internal storage device 120. In addition, the PCB 115 may include a diode operationally configured to prevent the one or more solar cells 110 from dissipating voltage.

As shown in FIGS. 11 and 13, the PCB 115 may also include a wake-up system including an accelerometer or a motion sensor 123 mounted to the PCB 115, whereby the MCU 118 is programmed to shut to OFF automatically in instances when no motion of the cap assembly 100 is detected for a programmed or set period of time, e.g., a desired time period such as from 1.0 minutes to 60.0 minutes, and turn to ON automatically when the accelerometer or motion sensor detects motion of the cap assembly 100 and thus, motion of the optical sighting system. For example, a motion sensor 123 may include a motion signal output in electrical communication with an MCU 118 having a detection circuit and a wake-up signal output. One non-limiting example of a motion sensor includes a mechanical motion sensor.

Figure 20:
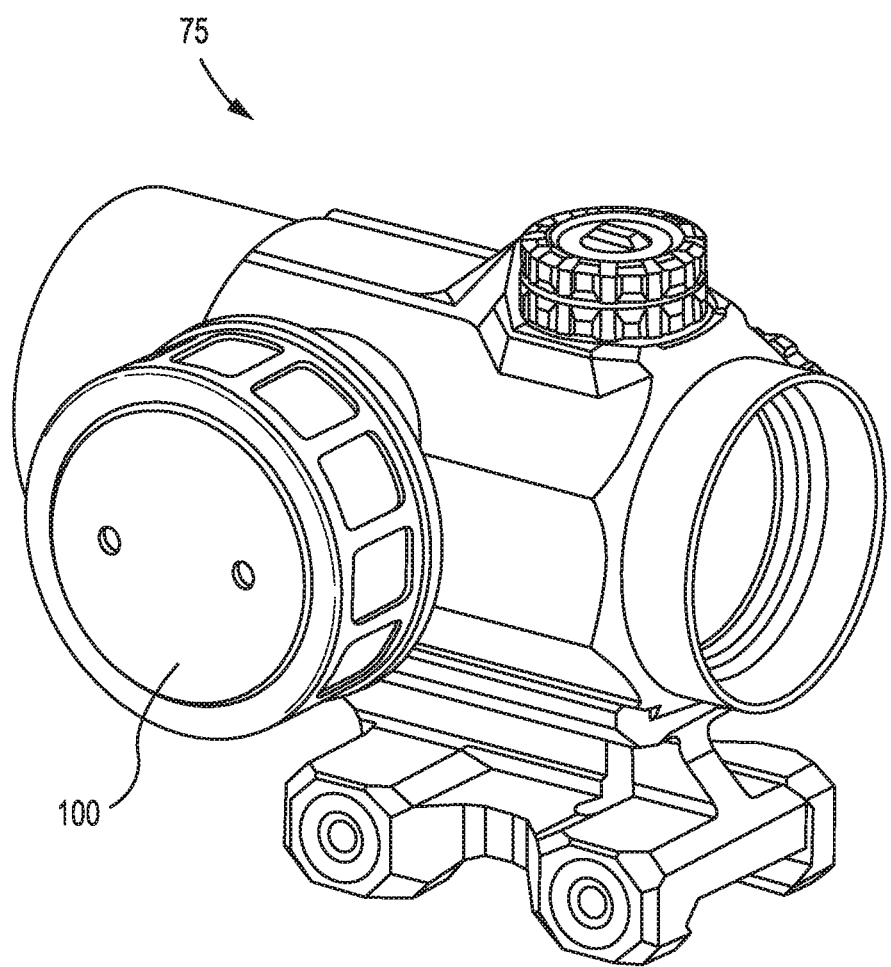
FIG. 20 is a top perspective view of an embodiment of a firearm optical sighting system comprising a solar powered cap assembly as depicted in FIG. 11.

In one embodiment, the cap assembly 100 may be provided as part of an OE solar powered optical sighting system 75 (see FIG. 20). In another embodiment, the cap assembly 100 may be provided as part of an OE solar powered optical sighting system and also be operationally configured for use with third-party optical sighting systems 5, 6, 7 wherein the cap assembly 100 replaces the OE battery cap 15 and the coin cell battery 35 in a manner effective to mimic the power input system of third-party optical sighting systems 5, 6, 7. In still another embodiment, the cap assembly 100 may be provided as a replacement for OE battery caps 15 and coin cell batteries 35 of third-party optical sighting systems 5, 6, 7.

The configuration of the present cap assembly 100, including the incorporation of an internal storage device 120, is effective to provide proper functioning of an optical sighting system in low light and nighttime applications. Commercially available third-party optical sighting systems 5, 6, 7 as described in reference to FIGS. 1-8, typically use coin cell batteries 35 with a service life up to about 50,000 hours. As such, the internal storage capacity and charging rate of the present internal storage device 120 may be relatively low, e.g., capacity of 50.0 Amp-hours, to achieve virtually infinite illumination power as long as the average current collected by the cap assembly 100 exceeds the power requirements of the corresponding optical sighting system.

In still another embodiment wherein the cap assembly 100 is provided as part of an OE solar powered optical sighting system, the cap assembly 100 may be provided as a snap-on type cap or a quarter-turn type locking cap. In addition to firearm related optical sighting systems, it is also contemplated that the cap assembly 100 may be used as a replacement power source for other electric power devices that make use of coin cell batteries including, but not necessarily limited to flashlights, laser pointers, headphones, medical devices, toys, remote controls, key fobs, holiday ornaments, cameras, and candles.

Although the disclosure is described above in terms of various exemplary embodiments and implementations, it should be understood that the various features and functionality described in one or more of the individual embodiments are not limited in their applicability to the particular embodiment with which they are described, but instead might be applied, alone or in various combinations, to one or more other embodiments whether or not such embodiments are described and whether or not such features are presented as being a part of a described embodiment Thus, the breadth and scope of the claimed invention should not be limited by any of the above-described embodiments.

Terms and phrases used in this document, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or "an" should be read as meaning "at least one," "one or more," or the like.

Persons of ordinary skill in the art will recognize that many modifications may be made to the present disclosure without departing from the spirit and scope of the disclosure. The embodiment(s) described herein are meant to be illustrative only and should not be taken as limiting the disclosure, which is defined in the claims.

I claim:

1. A power source for a firearm optical sighting system equipped with a power input system including a battery compartment for housing a removable coin cell battery and a removable battery cap configured to secure the coin cell battery within the battery compartment, the battery compartment having a positive contact located within the battery compartment and a negative contact located within the battery compartment, the power source comprising:
   a solar powered cap assembly including:
      a housing configured to mate with the battery compartment;
      one or more solar cells;
      one or more rechargeable electrical energy storage devices;
      control circuitry in electrical communication with the one or more solar cells and the one or more rechargeable electrical energy storage devices;
      a positive power output contact in electrical communication with the control circuitry; and
      a negative power output contact in electrical communication with the control circuitry;
   wherein when the housing is mated with the battery compartment, the positive power output contact is configured to electrically communicate with the positive contact within the battery compartment and the negative power output contact is configured to electrically communicate with the negative contact within the battery compartment in a manner effective for the power source to power the firearm optical sighting system.

2. The power source of claim 1 wherein the one or more solar cells are configured to convert light energy into electrical energy and wherein the control circuitry is configured to feed electricity at a controlled voltage and controlled rate into the firearm optical sighting system.

3. The power source of claim 2 wherein the housing comprises an outer surface and the one or more solar cells are disposed on the outer surface of the housing.

4. The power source of claim 3 wherein the one or more solar cells include one or more flexible thin-film photovoltaic solar cells selected from the group consisting of monocrystalline thin-film solar cells, cadmium telluride thin-film solar cells, copper indium gallium selenide ("CIGS") thin-film solar cells, gallium arsenide thin-film solar cells, amorphous silicon thin-film solar cells, and combinations thereof.

5. The power source of claim 2 wherein the control circuitry includes a printed circuit board in electrical communication with the positive power output contact and the negative power output contact.

6. The power source of claim 5 wherein the printed circuit board is disposed between the one or more rechargeable electrical energy storage devices and the negative power output contact.

7. The power source of claim 5 further including a second positive contact between the one or more rechargeable electrical energy storage devices and the printed circuit board and a second negative contact between the one or more rechargeable electrical energy storage devices and the printed circuit board, wherein the second negative contact is configured as a spacer between the one or more rechargeable electrical energy storage devices and the printed circuit board.

8. The power source of claim 2 wherein the control circuitry includes a printed circuit board with a micro control unit and a motion sensor in electrical communication with the micro control unit, wherein the motion sensor is configured to detect motion of the power source and wherein the micro control unit is programmed to turn the power source OFF when no motion of the power source is detected for a desired time period and programmed to turn the power source ON when the motion sensor detects motion of the power source.

9. The power source of claim 1 wherein the one or more solar cells are configured to convert light energy into electrical energy and wherein the housing comprises an outer perimeter surface including a cavity configured to receive and hold the one or more solar cells therein.

10. The power source of claim 9 including a transparent protective cover disposed over the one or more solar cells within the cavity of the housing.

11. The power source of claim 1 wherein the power source is configured to replace the removable coin cell battery and the removable battery cap of the battery compartment of the firearm optical sighting system.

12. The power source of claim 1 wherein the housing is configured to threadably mate with the battery compartment.

13. The power source of claim 1 including a power output insulating ring disposed between the positive power output contact and the negative power output contact.

14. A power source for a firearm optical sighting system comprising an illuminated reticle and equipped with a power input system including a battery compartment for housing a removable coin cell battery and a removable battery cap configured to secure the coin cell battery within the battery compartment, the battery compartment having a positive contact ring located within the battery compartment and a negative contact located on a floor of the battery compartment, the power source comprising:
 a cap assembly including (1) a housing configured to threadably mate with the battery compartment of the firearm optical sighting system, (2) one or more solar cells disposed on an outer perimeter of the housing configured to convert light energy into electrical energy, (3) a positive power output contact and a negative power output contact, (4) one or more rechargeable electrical energy storage devices configured to store the electrical energy, (5) control circuitry in electrical communication with the one or more solar cells, the positive power output contact, the negative power output contact, and the one or more electrical energy storage devices, wherein the control circuitry is configured to feed power at a controlled voltage and controlled rate to the firearm optical sighting system;
 wherein when the housing is threadably mated with the battery compartment, the positive power output contact is electrically communicated with the positive contact ring within the battery compartment and the negative power output contact is electrically communicated with the negative contact located on the floor of the battery compartment.

15. The power source of claim 14 wherein the control circuitry includes a printed circuit board in electrical communication with the one or more solar cells, in electrical communication with the one or more electrical energy storage devices, and in electrical communication with the battery compartment of the firearm optical sighting system.

16. The power source of claim 15 wherein the printed circuit board includes a micro control unit and a motion sensor in electrical communication with the micro control unit.

17. The power source of claim 15 further including a negative power output spring contact in electrical communication with the printed circuit board, wherein the negative power output spring contact is configured to bias the negative power output contact toward the negative contact on the floor of the battery compartment.

18. The power source of claim 14 wherein the positive power output contact is annular.

* * * * *